(12) United States Patent
Mantock

(10) Patent No.: US 7,782,595 B2
(45) Date of Patent: Aug. 24, 2010

(54) BUFFER CAPACITOR, A ZERO OPERATIONAL RESISTANCE CAPACITOR

(76) Inventor: Paul Lenworth Mantock, 75 Evergreen Way, Hayes, Middlesex (GB) UB3 2BH ( * ) Notice: Subject to any disclaimer, the term of this patent is extended or adjusted under 35 U.S.C. 154(b) by 211 days.

(21) Appl. No.: 10/483,541

(22) PCT Filed: Jul. 4, 2002

(86) PCT No.: PCT/GB02/03091

§ 371 (c)(1),
(2), (4) Date: Jan. 3, 2004

(87) PCT Pub. No.: WO03/005386

PCT Pub. Date: Jan. 16, 2003

(65) Prior Publication Data

US 2004/0240145 A1 Dec. 2, 2004

(30) Foreign Application Priority Data

Jul. 4, 2001 (GB) .................................. 0116365.8

(51) Int. Cl.
*H01G 9/00* (2006.01)

(52) U.S. Cl. .................... 361/512; 361/502; 361/504; 361/508; 361/516; 361/523

(58) Field of Classification Search .............. 361/301.2, 361/301.5, 307, 308.1, 323, 309, 311, 312, 361/502, 503–504, 516–519, 303–305, 523–528, 361/508–512
See application file for complete search history.

(56) References Cited

U.S. PATENT DOCUMENTS

| | | | | |
|---|---|---|---|---|
| 5,426,561 A | * | 6/1995 | Yen et al. | 361/502 |
| 5,555,155 A | * | 9/1996 | Patel et al. | 361/503 |
| 5,568,353 A | * | 10/1996 | Bai et al. | 361/523 |
| 6,137,673 A | * | 10/2000 | Andou et al. | 361/502 |
| 6,246,569 B1 | * | 6/2001 | Strange et al. | 361/508 |
| 6,275,371 B1 | * | 8/2001 | Yoshio et al. | 361/502 |
| 6,421,227 B2 | * | 7/2002 | Nitoh et al. | 361/523 |
| 6,507,479 B2 | * | 1/2003 | Saito et al. | 361/502 |
| 6,636,417 B2 | * | 10/2003 | Sakata et al. | 361/502 |

* cited by examiner

*Primary Examiner*—Nguyen T Ha

(57) ABSTRACT

A buffer capacitor having a least one pair of plates and each plate 10 of the pair of plates is in the form of a loop current or charge buffer having, an electric conducting material 21 arranged in parallel and electrically joined 22 to form a closed loop and the inner perimeter 23 of the electric conducting material forming the said closed loop is prevented from any physical contact with itself, by having a dielectric material 11 disposed therein, thereby forming a closed continuous electrical loop and each plate 10 is provided with at least one buffer or conventional connector and are arranged one on top of the other in alignment separated by alternate layers of a dielectric material 12 and tightly wound.

5 Claims, 3 Drawing Sheets

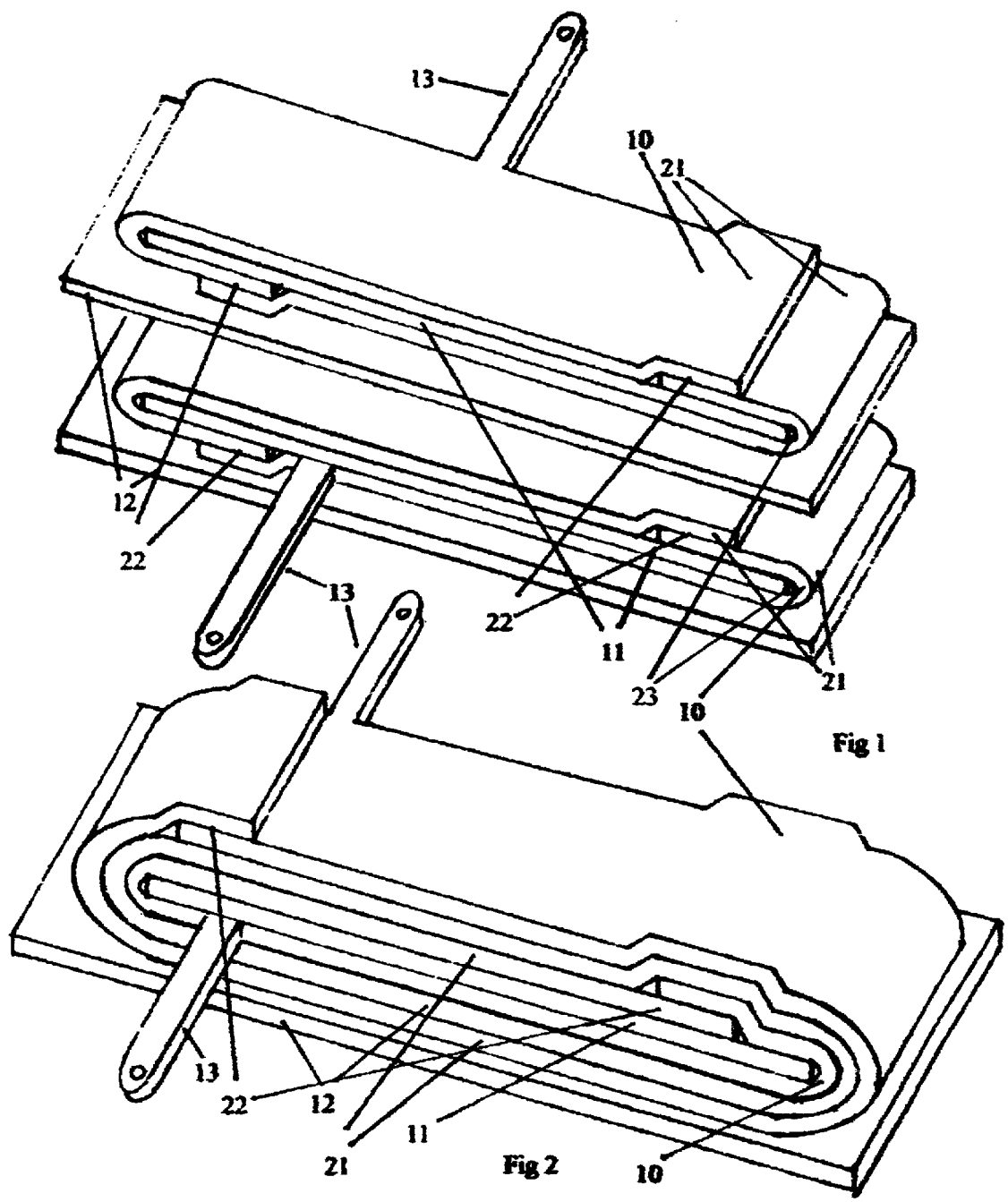

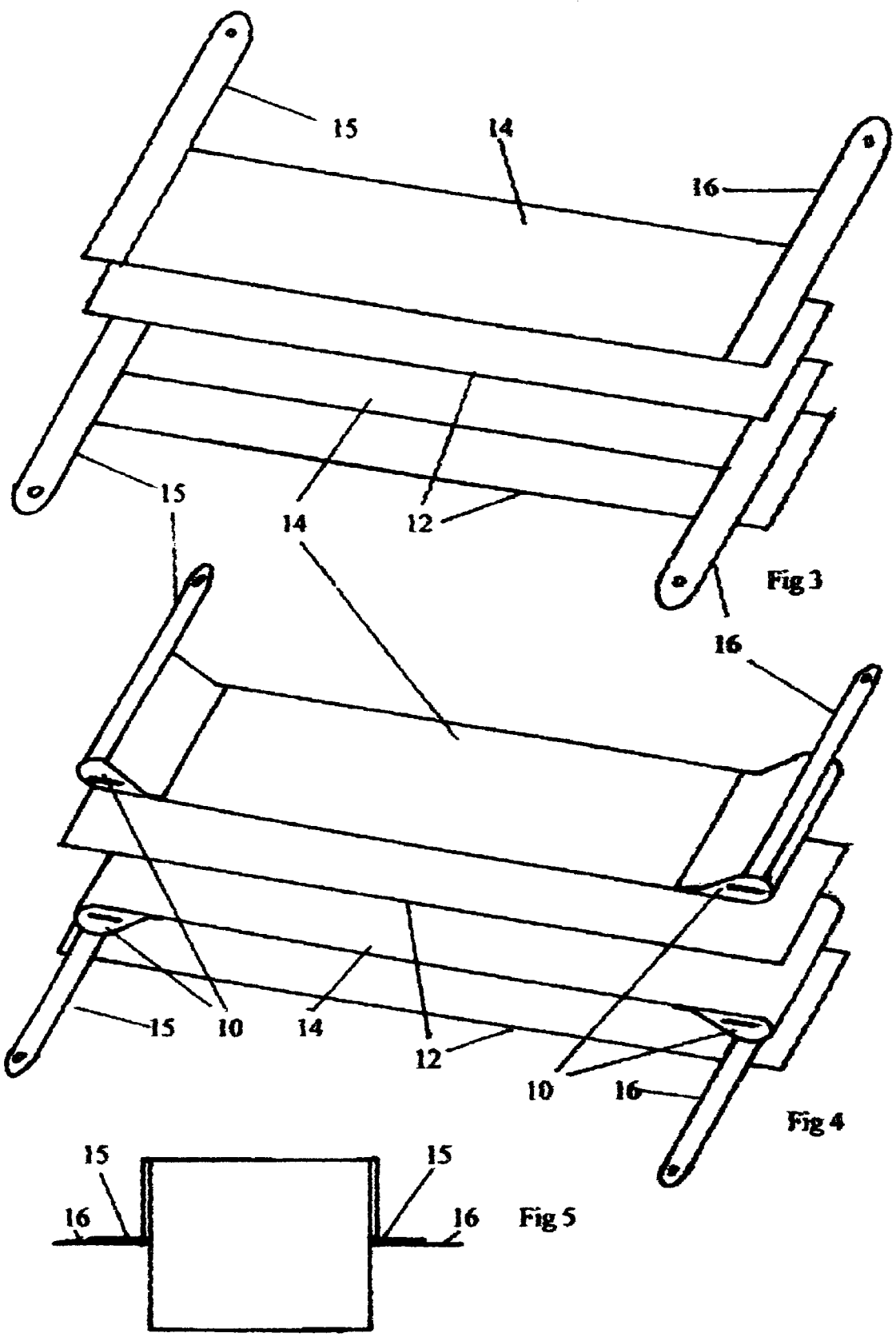

BUFFER CAPACITOR, A ZERO OPERATIONAL RESISTANCE CAPACITOR

CROSS-REFERENCE TO RELATED APPLICATION

This application claims priority date of Patent Application No. 0116365 filed 2001 Jul. 4 by the present inventor.

FEDERALLY SPONSORED RESEARCH

Not applicable

SEQUENCE LISTING OR PROGRAM

Not applicable

BACKGROUND OF INVENTION

1. Field of Invention

The invention relates to a buffer capacitor.

Capacitors are used to store electric charge and in doing so concentrates the charge at the ends of the positive plate and at the point of contact between the capacitor connector and the positive plate. These concentrated charges eventually build up and leak to the negative plate causing resistive heating and inducing inductance impairing the performance of the capacitor and can result in capacitor failure.

2. Prior Art

In attempts to reduce resistive heating and induced inductance various combinations of plate geometry and dielectric manipulations has been tried with limited success. One such attempt is by Charles C Rayburn U.S. Pat. No. 814,958. His capacitor is made from a plurality of plates, each plate being made of a thin film dielectric material, metallized on both sides and the plates and separating dielectric material are folded in a certain way and are laid in a staggered arrangement, whereby all the dielectric material is inside the electric field of the capacitor, after winding. This arrangement of plates and dielectric, improved the performance of the capacitor, but there is still the problem of the plate ends, where charge concentrates, leading to resistive heating and induced inductance, consequently like all current capacitors, it has limitations on its upper operational temperature usage, and the complex way in which the plates are folded, makes this capacitor more expensive manufacture.

Another attempt is the Slit-Foil Capacitor Application no. PCTGB/95/00213. This inventor simply made slits in the capacitor plate and the performance of the capacitor improved, but again, the ends of the plate still caused charge concentration, resulting in resistive heating and induce inductance, limiting the capacitor to an upper operational temperature limit. This capacitor requires the capacitor plates to be made with slits before it can be wound, thereby adding another element to manufacture, increasing manufacturing costs.

All currently available capacitors have upper operational temperature limitations due to resistive heating, showing clearly that resistive heating is still a significant problem in all capacitors in use in electronic and electrical applications. It is the view by experts in the capacitor industry, that resistive heating and induced inductance can be reduced, but cannot be eliminated completely.

SUMMARY

This invention relates to a buffer capacitor having at least one pair of positive and negative plates. Each plate is in the form of a loop current or charge buffer, which comprises an electric conducting material, which may be rigid or flexible, arranged in parallel, electrically insulated from each other by a dielectric material and electrically joined to form a closed continuous electrical loop thereby eliminating the ends of the plates and subsequently charge concentration. The plates are arranged one on top the other in parallel and is electrically insulated from each other by alternate layers of a dielectric material or placed one inside the other and is electrically insulated from each other by dielectric material and can be tightly wound or laid flat. Each plate is provided with a conventional or a buffer connector, which comprises of a length of an electric conducting material which may be thin in cross-section over part or all of its length and electrically insulated over part of its thin length, the remaining length being of suitably sized and shaped cross-section, or either or each end provided with an eyelet for electrical connection. The thin cross-sectioned un-insulated part of the connector is electrically connected to the plate and the remaining length is folded back parallel and is insulated from the connected length or folded around the plate with the un-insulated length electrically connected to the plate and the remaining length insulated from the plate and the eyelet ends are electrically connected in each case to form a closed continuous electrical loop thereby reducing or eliminating charge concentration at the point of contact between the plate and the connector.

Or each positive and negative plate is comprised of a rigid or flexible electric conducting material formed into a current or charge buffers by providing each end of each plate with a conventional or buffer connector, or each end of each plate is provided with or formed into a current or charge buffer with a conventional or buffer connector electrically connected to each current or charge buffer. In each case at least one positive and one negative plate is arranged in parallel one on top of the other and is electrically insulated from each other by alternate layers of a dielectric material and the conventional or buffer connectors at the ends of the same plate is electrically connected after tightly winding or remaining rigid and is electrically connected in each case forming a closed continuous electrical loop and can be used for electrical connection.

The invention is explained with reference to the accompanying drawings

FIG. 1 shows in perspective the positive and negative plate in the form of current or charge buffers arranged to form a buffer capacitor.

FIG. 2 shows the positive and negative plates in the form of current or charge buffers arranged one inside the other.

FIG. 3 shows the positive and negative plates with a conventional or buffer connector at each extreme end of each plate.

FIG. 4 shows the positive and negative plates with a current or charge buffer at each end of each plate.

FIG. 5 shows a side view of the capacitor showing the conventional or buffer connectors connected after winding.

Figure 6:
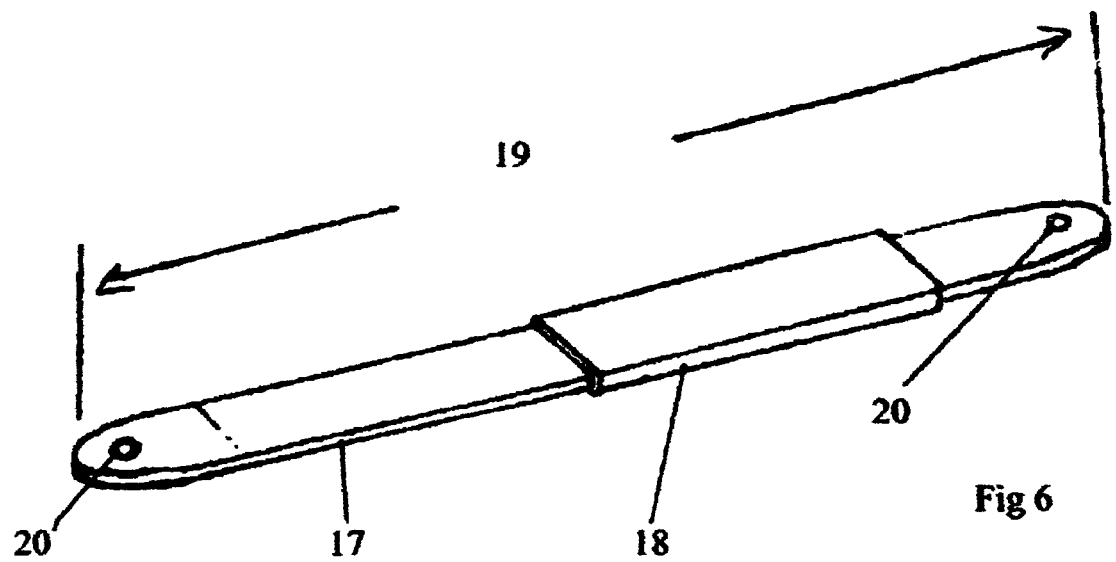
FIG. 6 shows the buffer connector before folding.
Figure 7:
FIG. 7 shows the buffer connector electrically connected to the plate.
Figure 8:
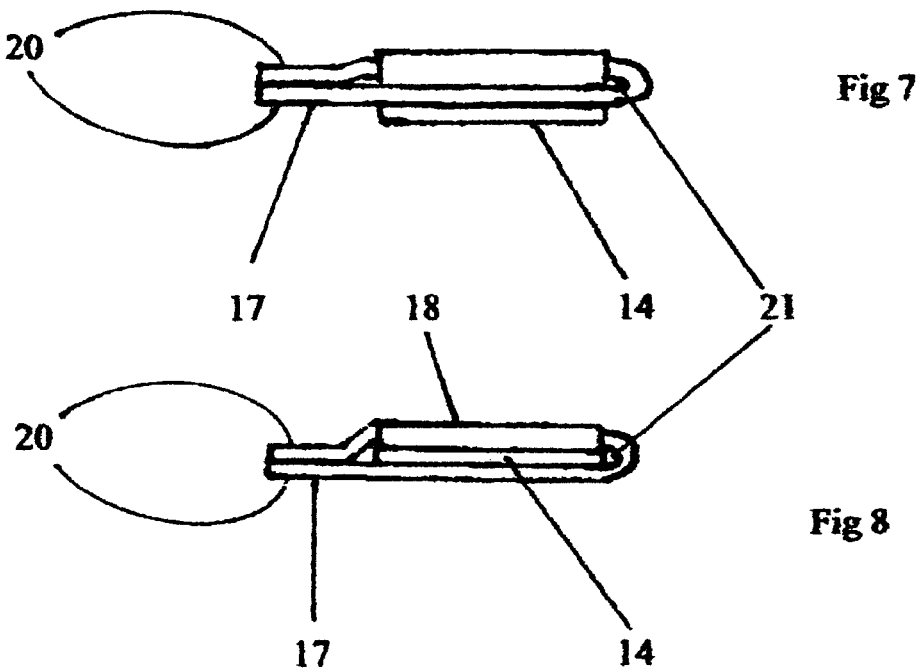
FIG. 8 shows the connector electrically connected to and wrapped around the plate.

From the drawings FIG. 1 the invention relates to a buffer capacitor having at least one pair of positive and negative plates. Each plate is in the form of a loop current or charge buffer 10, which comprises an electric conducting material 21, which may be rigid or flexible, arranged in parallel, electrically insulated from each other by a dielectric material 11 and electrically joined 22 to form a closed electrical loop. The plates 10 are arranged on top the other in parallel and is electrically insulated from each other by alternate layers of a dielectric material 12 or as shown in FIG. 2 the loop current or charge buffer 10 placed on inside the other and is electrically insulated from each other by a dielectric material 12 and tightly wound (not shown) or laid flat as in FIG. 1 and FIG. 2. Each plate is provided with a conventional or a buffer connector 13, which comprises of a length of an electric conducting material as shown in FIG. 6 which may be thin cross-section over part or all of its length 19 and electrically insulated 18 over part of its thin length the remaining length being of suitably sized and shaped cross-section, either or each end provided with an eyelet 20 for electrical connection. As shown in FIG. 7 and FIG. 8 the thin cross-sectioned un-insulated 17 part of the connector is electrically connected to the plate 14 and the remaining length is folded back parallel and is insulated 18 from the connected length or folded around the plate with the un-insulated 17 length electrically connected to the plate 14 and the remaining length insulated 18 from the plate and the eyelet 20 ends electrically connected in each case to form a closed continuous electrical loop.

Or buffer capacitor as shown in FIG. 3 where each positive and negative plate 14 is comprised of a rigid or flexible electric conducting material is formed into a current or charge buffers by providing each plate 14 with conventional or buffer connectors 15 and 16 at its extreme ends, or as shown in FIG. 4 each end of each plate is provided with or formed into a current or charge buffer 10 with conventional or buffer connectors 15 and 16 electrically connected to each current or charge buffer 10. The plates in each case 14 are arranged in parallel one on top of the other electrically insulated from each other by alternate layers of a dielectric material 12 and the conventional or buffer connectors 15 and 16 at the ends of the same flexible positive and negative plate or the conventional or buffer connectors 15 and 16 electrically connected to the loop current or charge buffers 10 at the ends of the same plate are electrically connected after winding as shown in FIG. 5 and in each case can be used for electrical connection and is electrically sealed (not shown) or the conventional or buffer connectors 15 and 16 at the ends of each positive and negative rigid plate are electrically connected by some means (not shown) forming a closed continuous electrical loop and is electrically sealed (not shown).

The invention claimed is:

1. A buffer capacitor comprising at least one pair of plates:
    (a) and each of the said pair of plates comprising an electric conducting material being arranged into at least one closed continuous electrical loop, eliminating the plate ends of the said pair of plates, thereby eliminating charge concentrations at the ends of the said pair of plates,
    (b) and each of the said pair of closed continuous electrical loop plates being provided with at least one closed loop connector as means to connect each of the said pair of plates to an electric circuit
    (c) and each of the said closed continuous electrical loop plates provided with the said closed loop connector are arranged in alignment with each other sandwiching at least one layer of a dielectric material.

2. A buffer capacitor comprising at least one pair of plates:
    (a) and each of the said pair of plates comprising an electric conducting material being arranged into at least one closed continuous electrical loop, eliminating the plate ends of the said pair of plates, thereby eliminating charge concentrations at the ends of the said pair of plates,
    (b) and each of the said pair of closed continuous electrical loop plates being provided with at least one connector as means to connect each of the said pair of plates to an electric circuit
    (c) and each of the said closed continuous electrical loop plates provided with the said connector are arranged in alignment with each other sandwiching at least one layer of a dielectric material.

3. A buffer capacitor as in claim 1 or claim 2 wherein at least two of the said closed continuous electrical looped plates are arranged in alignment one inside the other and being separated by at least one layer of a dielectric material.

4. A buffer capacitor as in claim 1 or claim 2 wherein the said closed continuous electrical loop plate comprising:
    an electric conducting material being arranged into at least one closed continuous electrical loop, and the inner perimeter of the said electric conducting material of the said closed continuous electrical loop being provided with means disposed therein, preventing any contact of the said inner perimeter of the said electric conducting material of the said closed continuous electrical loop, with itself, thereby forming the said closed continuous electrical loop.

5. A buffer capacitor as in claim 1 each of the said closed loop plate of the said pair of plates being provided with at least one closed loop connector and the said closed loop connector comprising:
    an electric conducting material being arranged into at least one closed continuous electrical loop and the said electric conducting material being partially insulated over its length preventing any contact over the said partially insulated length of the inner perimeter of the said electric conducting material, with itself, thereby forming the said closed continuous electrical loop and the said closed continuous electrical loop is provided with means to be electrically connected to an electric circuit and the un-insulated length of the said electric conducting material of the said closed continuous electrical loop being used for electrical connection to that which is to be connected to an electric circuit such as each of the said pair of closed continuous electrical loop plates.

* * * * *